(12) United States Patent
Yeh et al.

(10) Patent No.: US 7,275,024 B2
(45) Date of Patent: Sep. 25, 2007

(54) AUTOMATIC GENERATION OF A DIMENSIONAL MODEL FOR BUSINESS ANALYTICS FROM AN OBJECT MODEL FOR ONLINE TRANSACTION PROCESSING

(75) Inventors: Adam Yeh, Bellevue, WA (US); Alvin Lo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 766 days.

(21) Appl. No.: 10/386,633

(22) Filed: Mar. 12, 2003

(65) Prior Publication Data

US 2004/0181440 A1 Sep. 16, 2004

(51) Int. Cl.
*G06F 17/10* (2006.01)

(52) U.S. Cl. .............................. 703/2; 703/13; 703/17; 703/21; 705/27; 705/39; 707/1; 707/10

(58) Field of Classification Search ........ 700/100–104; 702/1, 2, 6; 715/811; 703/17; 707/1, 10; 705/27, 39
See application file for complete search history.

(56) References Cited

U.S. PATENT DOCUMENTS

| | | | | |
|---|---|---|---|---|
| 5,499,371 | A | 3/1996 | Henninger et al. | 395/700 |
| 6,101,502 | A | 8/2000 | Heubner et al. | 707/103 |
| 6,212,524 | B1 | 4/2001 | Weissman et al. | 707/101 |
| 6,360,223 | B1 | 3/2002 | Ng et al. | 707/100 |
| 6,609,123 | B1 | 8/2003 | Cazemier et al. | 707/4 |
| 6,665,644 | B1 * | 12/2003 | Kanevsky et al. | 704/275 |
| 6,807,518 | B1 * | 10/2004 | Lang | 703/2 |
| 6,862,574 | B1 * | 3/2005 | Srikant et al. | 705/10 |
| 6,907,433 | B2 | 6/2005 | Wang et al. | 707/3 |
| 6,964,023 | B2 * | 11/2005 | Maes et al. | 715/811 |
| 6,980,980 | B1 | 12/2005 | Yeh | 707/2 |
| 7,007,029 | B1 * | 2/2006 | Chen | 707/100 |
| 7,111,010 | B2 * | 9/2006 | Chen | 707/102 |
| 7,185,016 | B1 | 2/2007 | Rasmussen | 707/100 |
| 2002/0070953 | A1 * | 6/2002 | Barg et al. | 345/700 |
| 2002/0087516 | A1 | 7/2002 | Cras et al. | 707/104 |
| 2002/0147848 | A1 | 10/2002 | Burgin et al. | 709/246 |
| 2003/0120593 | A1 * | 6/2003 | Bansal et al. | 705/39 |
| 2003/0187756 | A1 * | 10/2003 | Klivington et al. | 705/27 |
| 2004/0181502 | A1 * | 9/2004 | Yeh et al. | 707/1 |
| 2004/0215626 | A1 | 10/2004 | Colossi et al. | 707/2 |
| 2005/0120021 | A1 * | 6/2005 | Tang et al. | 707/10 |
| 2005/0246370 | A1 | 11/2005 | Rubendall | 707/103 |

OTHER PUBLICATIONS

"Issues of Object-Relational View Design in Data Warehousing Environment", Gopalkrishnan et al, IEEE 0-7803-4778-1/98, IEEE 1998.*
"Automating Data Warehouse Conceptual Schema Design and Evaluation", Phipps et al, DMDW'02, Canada, 2002.*
"Star/Snow-flak Schema Driven Object-Relational Data Warehouse and Query Processing Strategies", Gopalkrishnan et al, DaWak '99, LNCS, 1999.*

(Continued)

*Primary Examiner*—Fred Ferris
(74) *Attorney, Agent, or Firm*—Joseph R. Kelly; Westman, Champlin & Kelly, P.A.

(57) ABSTRACT

The present invention automatically generates a dimensional model from an object model. The relationships in the object model are used to infer foreign key relationships in the dimensional model.

26 Claims, 22 Drawing Sheets

OTHER PUBLICATIONS

"A survey of approaches to automatic schema matching", Rahm et al, The VLDB Journal 10: 334-350, Feb. 2001.*

European Search Report.

XML.com, "Mapping DTDs to Database," http://www.xml.com/1pt/a/2001/05/09/dtdtodbs.html, May 19, 2001.

XML. com, "RAX: An XML Database API," http://www.xml.com/1pt/a/2000/04/26/rax/index.html, Apr. 26, 2000.

HiTSoftware, "Unifying XML and Relational Database Application Development," Jan. 2003, pp. 1-10.

Braganholo, et al., "On the Updatability of XML Views Over Relational Databases," International workshop on the Web and Databases (WebDB), Jun. 12-13, 2003, San Diego, California.

Meng, et al., "OrientStore: A Schema Based Native XML Storage System," 29th VLDB Conference, Berlin, German 2003.

Barrett, Alexandra, "Databases Embrace XML," SW Expert, Aug. 2001, pp. 43-47.

Coox, S.V., "Axiomatization of the Evolution of XML Database Schema," Programming Computer Software, vol. 29, No. 3, 2003, pp. 1-7, Jan. 29, 2003.

Hahsler, Dr. Michael. "Knowledge Management Data Warehouse and Data Mining," Department of Information Processing, Vienna University of Economics and BA, Dec. 11, 2001, pp. 2-29.

\* cited by examiner

FIG. 10

IBICodeGenerator

It is the primary interface for Code generation.

```
interface IBICodeGenerator
{
        void Generate(IConnection connection,
            ICube cube,
            string nameSpace);
}
```

TODO include ICube and IConnection interfaces

```
        public static DataSet GetFlattenedData(BICriteria criteria)
        {
        }
}
```

FIG. 13

```
public class BICriteria
{
        public BICriteria(BIContext context,CalculatedMemberList calculatedMemberList,
                AxisList axisList,Where where)
        {
        } public BICriteria(BIContext context,AxisList axisList,Where where)
        {
        } public BICriteria(BIContext context, CalculatedMemberList calculatedMemberList,
                AxisList axisList)
        {
        } public BICriteria(BIContext context,AxisList axisList)
        {
        } public static BIContext BIContext(params Type[] types)
        {
        } public static Where Where(params string[] sliceVals)
        {
        } public static Where Where(params Member[] members)
        {
        } public static Axis Axis(params Set[] sets)
        {
        } public static AxisList AxisList(params Axis[] axisList)
        {
        } public static AxisList AxisList(params Set[] sets)
        {
        } public static Set Set(params string[] vals)
        {
        } public static Set Set(params Member[] members)
        {
        } public static Set Set(params Tuple[] tuples)
        {
        } public static CalculatedMemberList CalculatedMemberList(params CalculatedMember[] calculatedMembers)
        {
        } public static CalculatedMemberList CalculatedMemberList(Member calculatedMember, ArithmeticExpression expression)
        {
        }
}
```

AUTOMATIC GENERATION OF A DIMENSIONAL MODEL FOR BUSINESS ANALYTICS FROM AN OBJECT MODEL FOR ONLINE TRANSACTION PROCESSING

BACKGROUND OF THE INVENTION

The present invention deals with satisfying reporting requirements for accessing data in a system modeled by an object model. More specifically, the present invention relates to a system for facilitating the reporting of business data by inferring a dimensional model from an object model.

When designing software applications involving business transactions, application developers conventionally use a model driven architecture and focus on domain specific knowledge. The model driven architecture often includes business objects (or business entities) involved in the business transactions, such as business entities corresponding to customers, orders and products. These entities are modeled as objects following the paradigm of object orientation.

Each object encapsulates data and behavior of the business entity. For example, a Customer object contains data such as name, address and other personal information for a customer. The Customer object also contains programming code, for example, to create a new Customer, modify the data of an existing Customer and save the Customer to a database.

The object model also enables a description of relationships among the business entities modeled. For example, a number of Order objects can be associated with a Customer object representing the customer who makes those orders. This is known as an association relationship. Other types of relationships can also be described, such as compositions. An Order, for example, can be "composed of" a collection of OrderLines. These OrderLines do not exist independently of the Order they belong to. In this way, application developers convert the business logic associated with their applications to a set of models. Applications are built that implement this business logic, often using on-line transaction processing (OLTP).

Objects in an object model typically store their data in a relational database. To satisfy traditional reporting requirements, data is retrieved through the relational database using extraction, transformation and loading (ETL) processes. Data is retrieved, using these processes, into a staging area known as a data mart.

Currently, there is a knowledge gap between users who work on data marts and those who perform OLTP application development. Those who work on data marts do not normally have knowledge about how the object model is constructed. Therefore, when the data is retrieved through the ETL processes, the business logic (such as the relationships and classes, etc.) that was built into the object model is lost.

Traditionally, therefore, in order to facilitate user's reporting requirements, another model known as a dimensional model is built from the data in the data mart. The dimensional model includes a Fact table, that has measures, and associated tables, that are referred to as dimensions. Once the dimensional model is built, a user can specify a query against the dimensional model to obtain data in a somewhat logical fashion, even through the business logic built into the object model was lost.

This type of system, however, requires that a great deal of time be spent in reconstructing the business logic (or at least part of the business logic) to obtain the dimensional model. This can require companies that use such systems to maintain two groups of programmers, one to develop the business logic and implement it in an object model, and another to support the reporting structure required by the company. Of course, this duplication of personnel is both costly and inefficient.

SUMMARY OF THE INVENTION

The present invention automatically generates a dimensional model from an object model. The relationships in the object model are used to project foreign key relationships in the dimensional model.

In one embodiment, a user specifies focal points of analysis for reporting. The user also specifies the object model and mappings from the entities represented by the object model to a persistent data storage system, such as a relational database.

In another embodiment, a second object model is automatically generated from the dimensional model. This allows a user to generate desired reports using only object oriented expressions. The object oriented expressions are translated to dimensional model query expressions which are executed against the dimensional model.

BRIEF DESCRIPTION OF THE DRAWINGS

FIG. 10 illustrates one embodiment of an example query to a dimensional model and corresponding result set.

FIG. 13 illustrates one exemplary interface for invoking the functionality of the entity generator.

FIG. 15 illustrates one exemplary embodiment of an interface to a BI criteria component.

FIG. 18 illustrates one exemplary result set.

Appendix A is an example of an XML focal point specification file.

Appendix B is an example of a mapping file.

Appendix C is an example of pseudo code illustrating the operation of the model services system.

Appendix D illustrates the interfaces supported by components of the model services system and the entity generator.

DETAILED DESCRIPTION OF ILLUSTRATIVE EMBODIMENTS

Various aspects of the present invention deal with a system for inferring a dimensional model from an object model to enable efficient reporting and analysis of data, and creating an object model from a dimensional model. However, prior to describing the present invention in greater detail, one embodiment of an illustrative environment in which the present invention can be used will be described.

Figure 1:
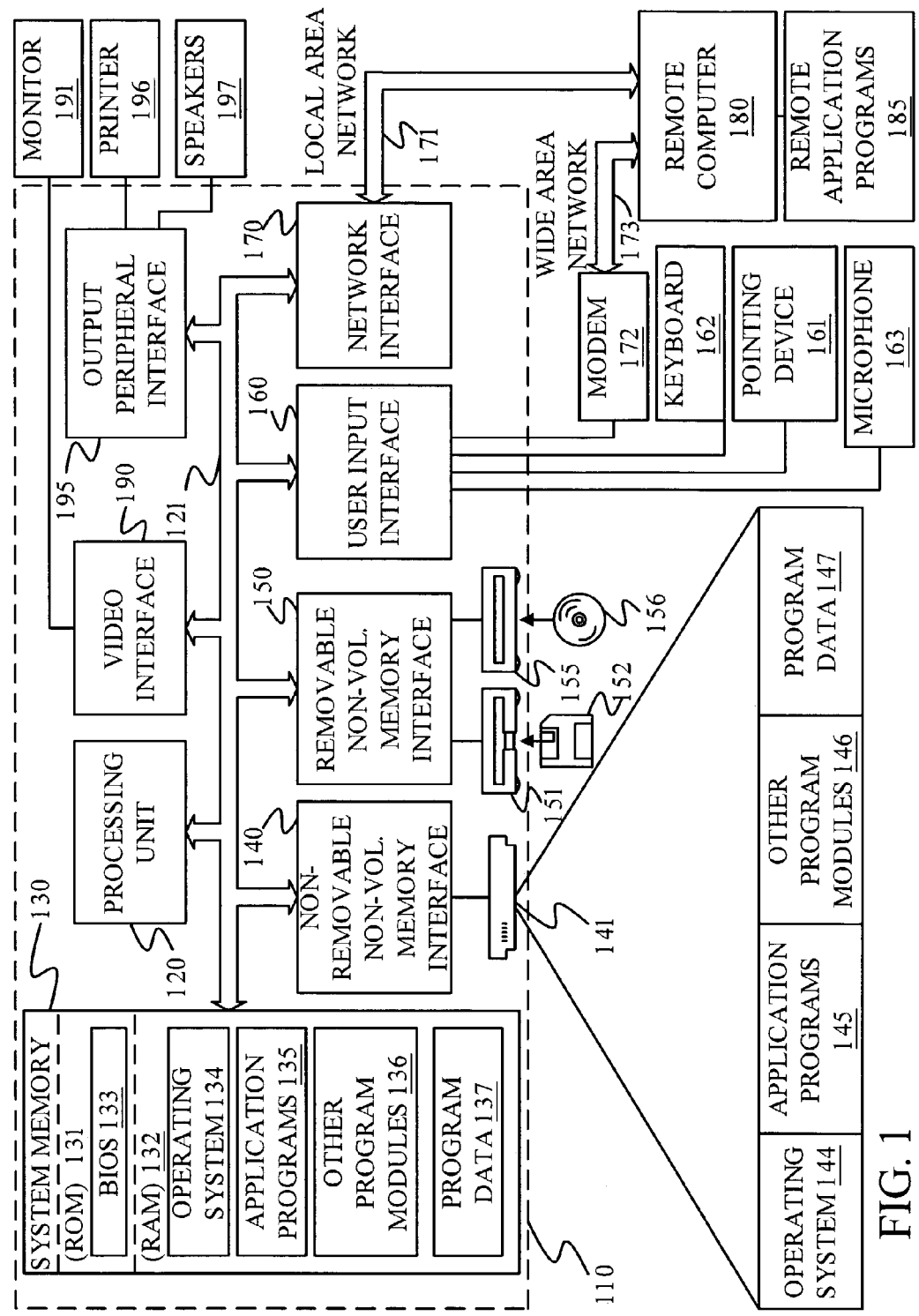
FIG. 1 is one exemplary embodiment of an environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
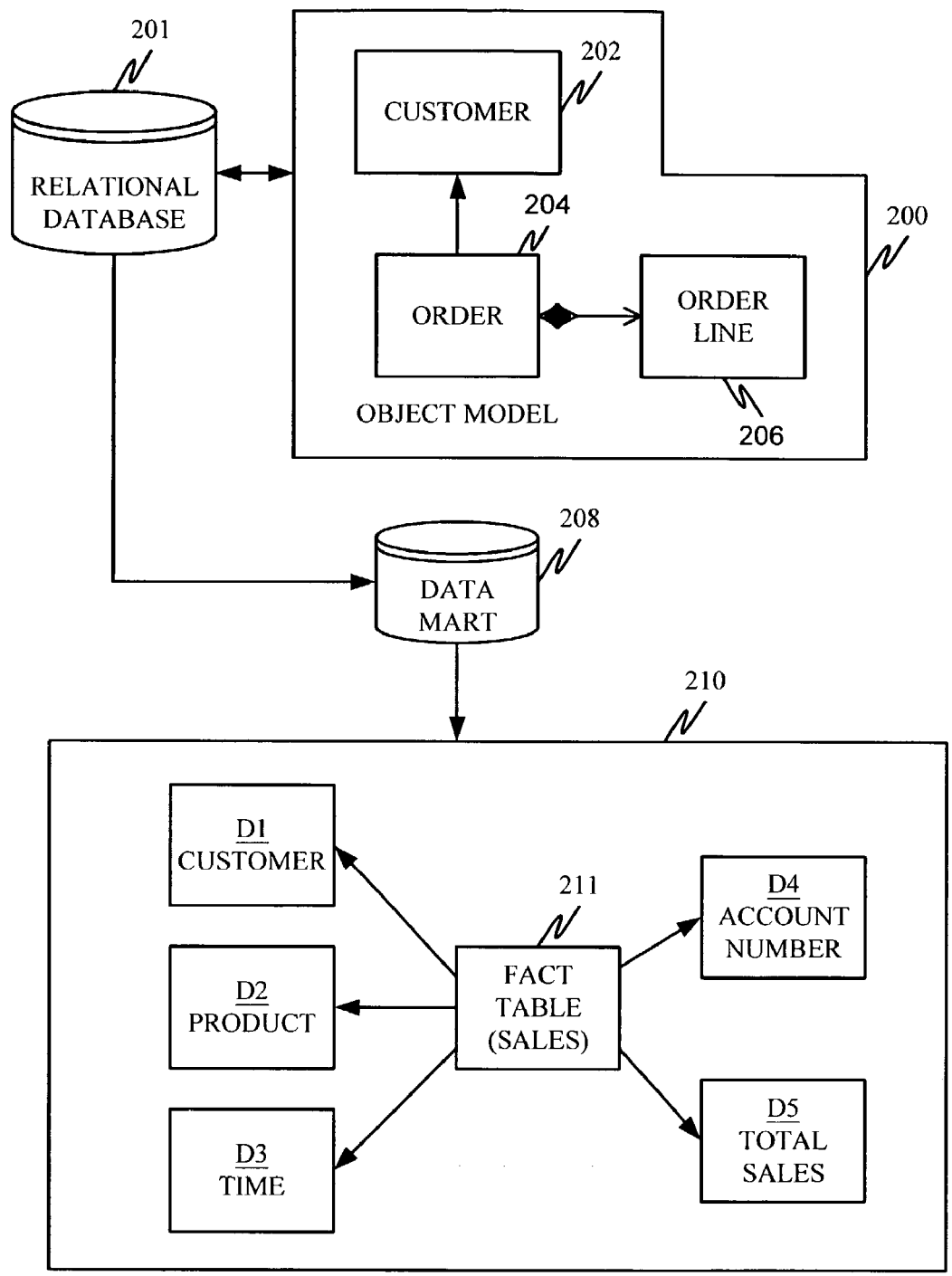
FIG. 2 illustrates a prior art system for implementing business logic and a reporting structure.

FIG. 2 is a block diagram illustrating data processing in accordance with the prior art. FIG. 2 illustrates that an application developer has implemented business logic used by an application by developing object model 200. As shown in FIG. 2, object model 200 includes a plurality of different business entities, including a Customer entity 202, an Order entity 204 and an OrderLine entity 206. The object model 200 uses notation which is commonly known as unified modeling language (UML). The notation shows a composition relationship between Order 204 and OrderLine 206. Thus, it indicates that the Order entity 204 is composed of one or more OrderLine entities 206. Object model 200 also shows that Order 204 has an association with Customer 200.

In prior systems, in order to support a desired reporting structure, data was first retrieved from a persistent data store (such as a relational database) 201 using extraction, transformation, and loading (ETL) processes and placed in a data mart 208 which acted as a staging area for the data prior to retrieving it.

Then, developers supporting the reporting structure for the user generated a dimensional model, such as model 210. The dimensional model typically includes a Fact table 212 which has measures noted therein. The Fact table 210 also has a plurality of dimensions illustrated as D1-D5 in FIG. 2. The dimensional model 210 was typically created based on the particular features in the data that the user desired to report on and analyze. Thus, some of the business logic implemented in object model 200 was recreated in dimensional model 210.

However, typically, the application developers that implement business logic through object models are different, and have a different knowledge base, than those who develop dimensional models. Therefore, a great deal of time and effort has traditionally been spent in reconstructing at least a part of the business logic implemented through object model 200 in obtaining a dimensional model 210 which can be used for reporting.

Another difficulty associated with some prior art techniques is that even to generate reports from dimensional model 210 required the report generator to be familiar with multi-dimensional expressions (MDX). MDX can be difficult to learn because it has a complex syntax, and it is different than the object oriented expressions required to create and interact with object model 200. Therefore, even after dimensional model 210 was constructed, generating reports has still required personnel with specialized knowledge, other than that used in object oriented programming.

Figure 3:
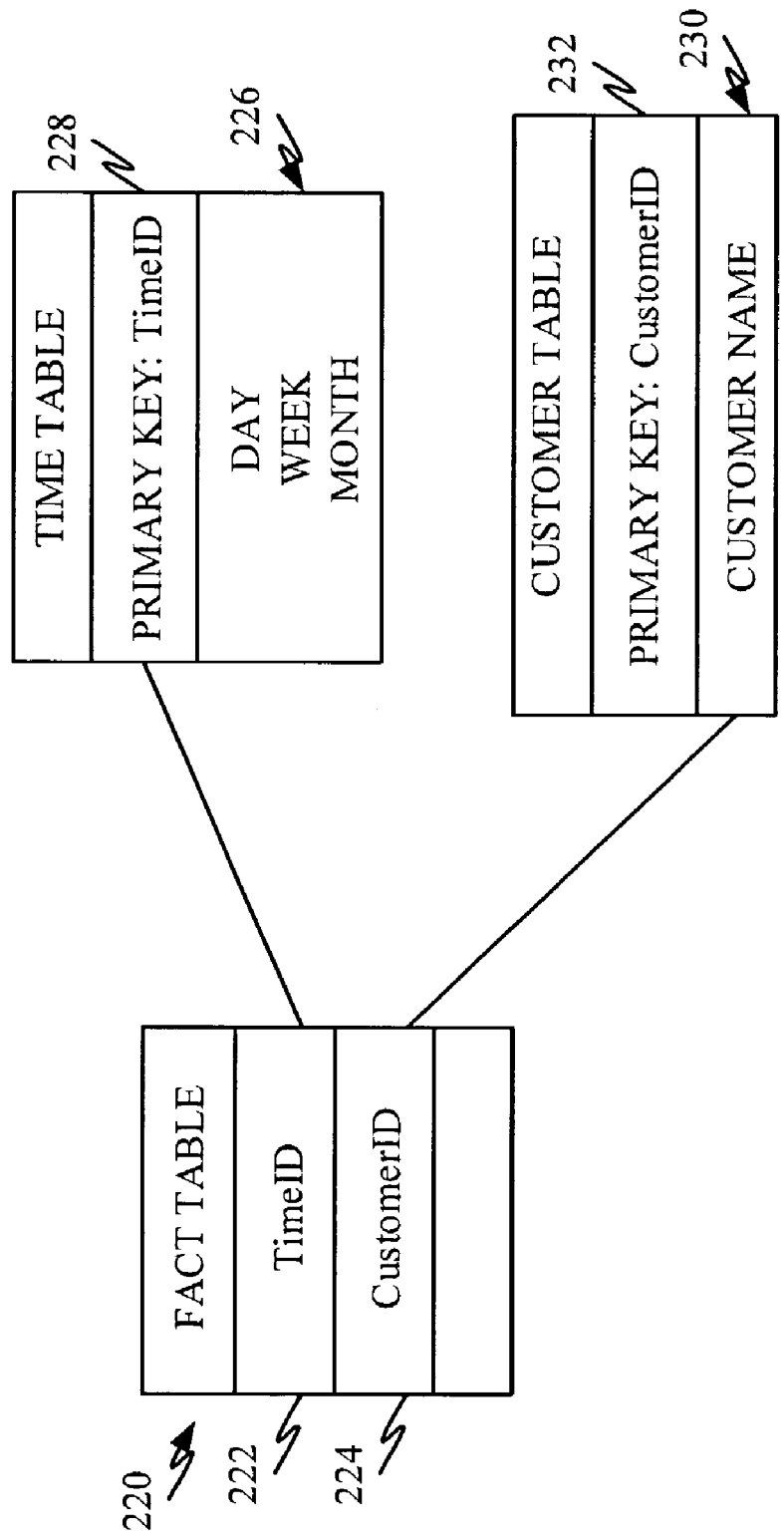
FIG. 3 is an example of a dimensional model illustrating a foreign key relationship.

Prior to describing the invention in greater detail, the concept of foreign key relationships will be discussed. FIG. 3 is a simplified diagram illustrating the concept of a foreign key relationship. FIG. 3 shows that a Fact table 220 includes other tables associated with "time" and "customer" as dimensions. Therefore, Fact table 220 includes a TimeID field 222 and a CustomerID field 224.

The Time table 226 includes a primary key referred to as TimeID in field 228. The primary key uniquely identifies a record in the Time table 226. Time table 226 also contains a number of additional fields related to time, such as day, week and month.

Customer table 230 also includes a primary key field that contains a primary key referred to as CustomerID 232. The primary key of the Customer table uniquely identifies a record in the Customer table. Of course, the Customer table also includes additional items associated with the customer, such as customer name.

Therefore, the primary key in a table is a unique identifier for the records in that table. However, the TimeID field 222 and CustomerID field 224 in Fact table 220 are identifiers which refer to other tables (in this case 226 and 230, respectively). Therefore, the keys contained in fields 222 and 224 in Fact table 220 are foreign keys. Some complexity arises with respect to foreign key relationships. For example, a table cannot be deleted if its primary key is a foreign key in another table, without dealing with the foreign key relationship. Otherwise, such a deletion breaks the integrity constraints typically imposed on such systems.

Figure 4A:
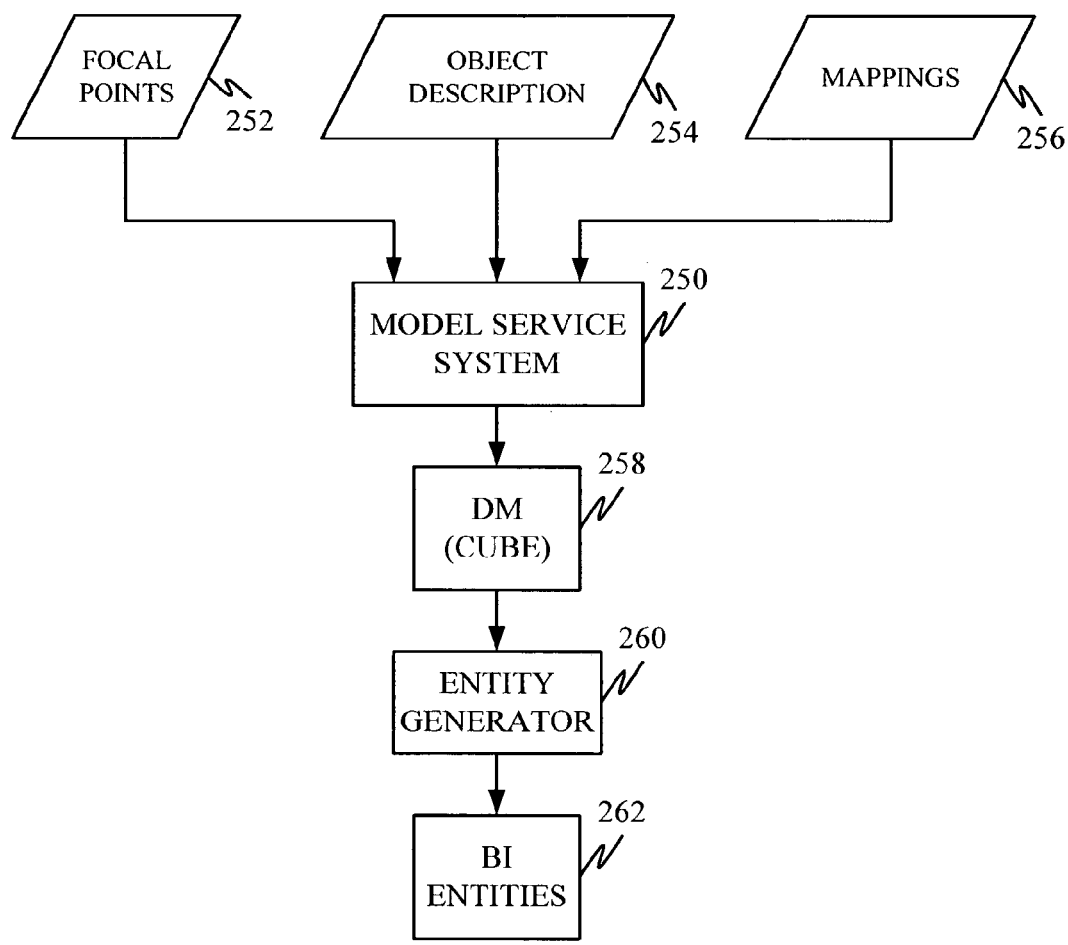
FIG. 4A is a block diagram of one embodiment of the present invention.

FIG. 4A is a simplified block diagram of one embodiment of the present invention. FIG. 4A illustrates a model services system 250 that takes, as inputs, a specification of focal points 252, an object description 254 and a set of persistent data store mappings 256. System 250 then produces a dimensional model 258 based on the inputs. FIG. 4A also illustrates an entity generator 260 that generates a set of object (or entities), referred to herein as business intelligence entities (or BI entities) 262, based on the dimensional model 258.

Focal points 252 represent certain data in the object model that is marked by the user as being a focal point of analysis. Focal points 252 can illustratively be specified in an XML specification file. One example of an XML specification file is shown in Appendix A hereto.

Figure 4B:
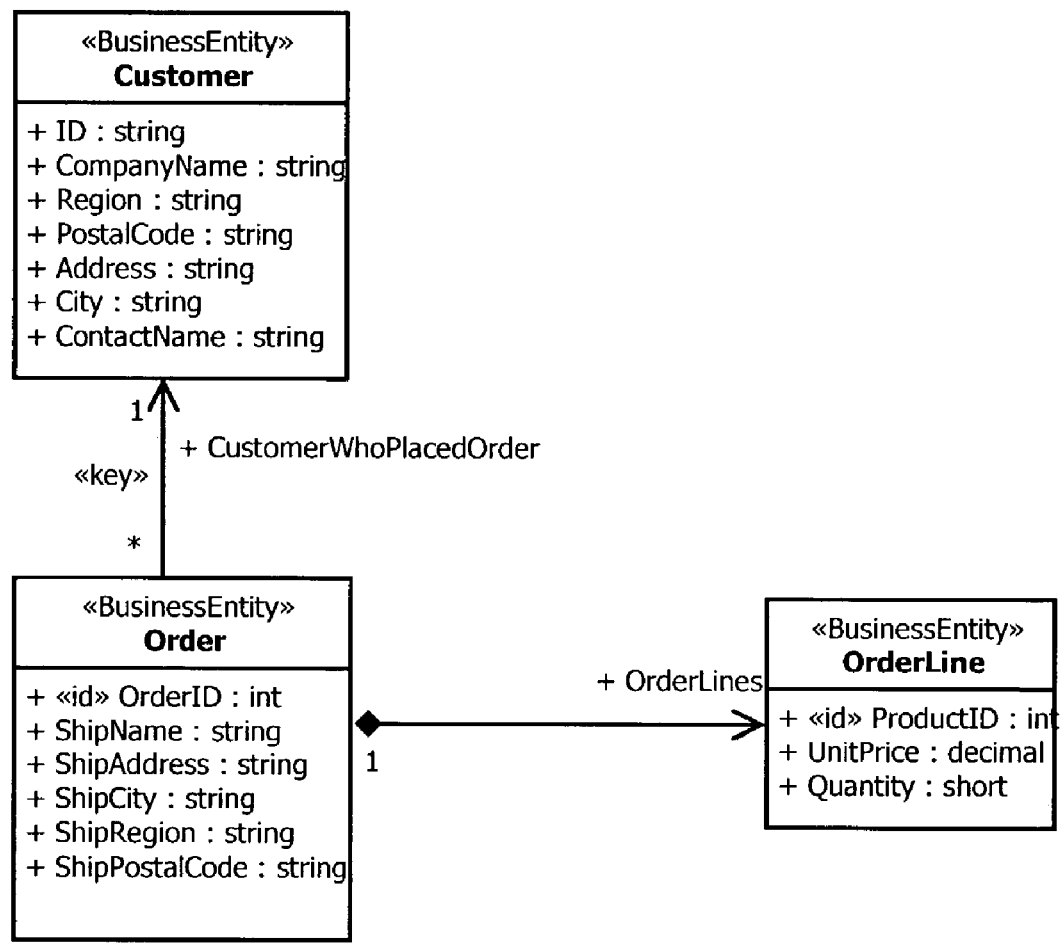
FIG. 4B is an example of an object model description in the form of a UML class diagram in accordance with one embodiment of the present invention.

Object description 254 is an input which describes the object orientation relationships in a set of metadata corresponding to a set of objects. This can take the form of, for example, a UML class diagram. One example of a UML class diagram for a plurality of business entities (Customer, Order and OrderLine) is illustrated in FIG. 4B.

Persistent data store mappings 256 map the data referred to by the object model to the persistent data store, in one illustrative embodiment the relational database 201 shown in FIG. 1. These are illustratively created by the user in the form of a map file, an example of which is found in Appendix B. The map file shown in Appendix B maps from a Customer entity to relational database tables.

Model services system 250 receives inputs 252, 254 and 256 and automatically generates a dimensional model 258 based on those inputs. In accordance with one embodiment of the present invention, dimensional model 258 is inferred from the inputs supplied by the user, and there is no requirement for a second set of developers to be involved in recreating the business logic to obtain model 258. In one embodiment, and as will be discussed in greater detail below, model services system 250 uses the associations and compositions in the object model specified by the object model description 254 to infer foreign key relationships in dimensional model 258. System 250 also uses the focal points of analysis defined by the user in file 252 and the persistent data store mappings 256 to create dimensional model 258 and access data through model 258. Therefore, one aspect of the invention is simply the automatic generation of dimensional model 258.

However, even a system which automatically generates dimensional model 258 can be improved. For example, obtaining information through dimensional model 258 still requires the user to know MDX or some sort of dimensional model querying language. Therefore, in accordance with another embodiment of the present invention, entity generator 260 is provided. Entity generator 260 creates business intelligence entities 262 in the form of objects, from the cubes and dimensions in dimensional model 258. This is also described in greater detail below.

Figure 4C:
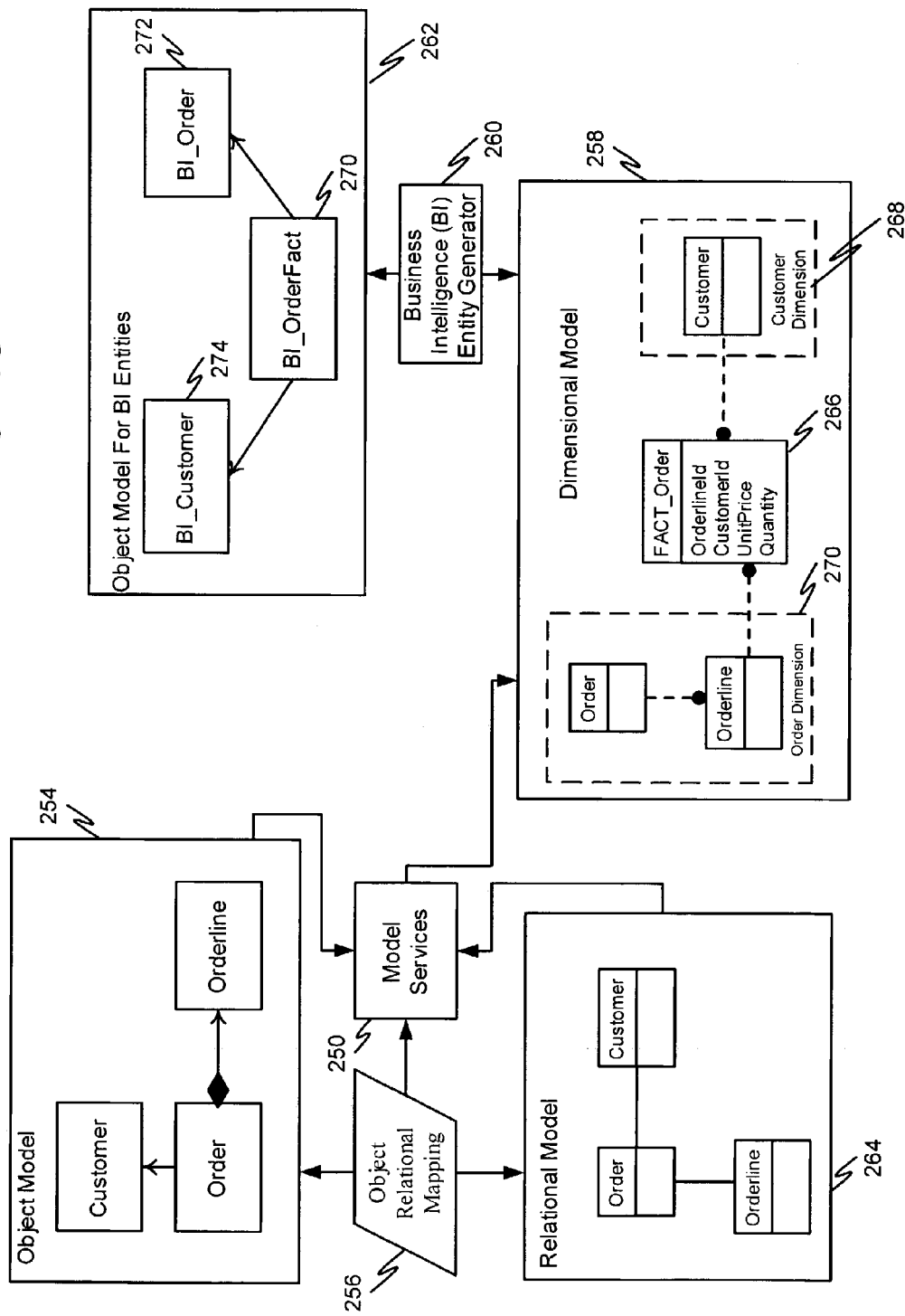
FIG. 4C is a more detailed block diagram of the system shown in FIG. 4A.

FIG. 4C illustrates the system shown in FIG. 4A, in greater detail. In the example illustrated in FIG. 4C, the object model is represented by object description 254, and the mappings 256 are shown between the object model representation 254 and the relational database representation 264 which represents relational database 201. FIG. 4C also shows dimensional model 258 in greater detail. Dimensional model 258 includes a Fact table 266 along with a plurality of dimensions 268 and 270 (the Customer dimension and the Order dimension). Each of the dimensions is formed of one or more tables. It is also worth noting that Fact table 266 includes the OrderlineID and CustomerID as foreign key references.

FIG. 4C also illustrates one embodiment of a set of BI entities 262. In the example shown in FIG. 4C, the BI entities 262 include a BIOrderFact entity 270, a BIOrder entity 272 and a BICustomer entity 274. Entities 272 and 274 are related to entity 270.

By looking at the entities and their relationships in object model description 254, it can be seen that the dimensional model will require a snowflake-schema, such as that shown in dimensional model representation 258. It can thus be inferred that two dimensions will be created, Order and Customer. The Order dimension will have two levels, Order and OrderLine. The measures (or numeric values) in the Fact table 266 will include UnitPrice and Quantity and will come from the OrderLine entities.

Figure 5:
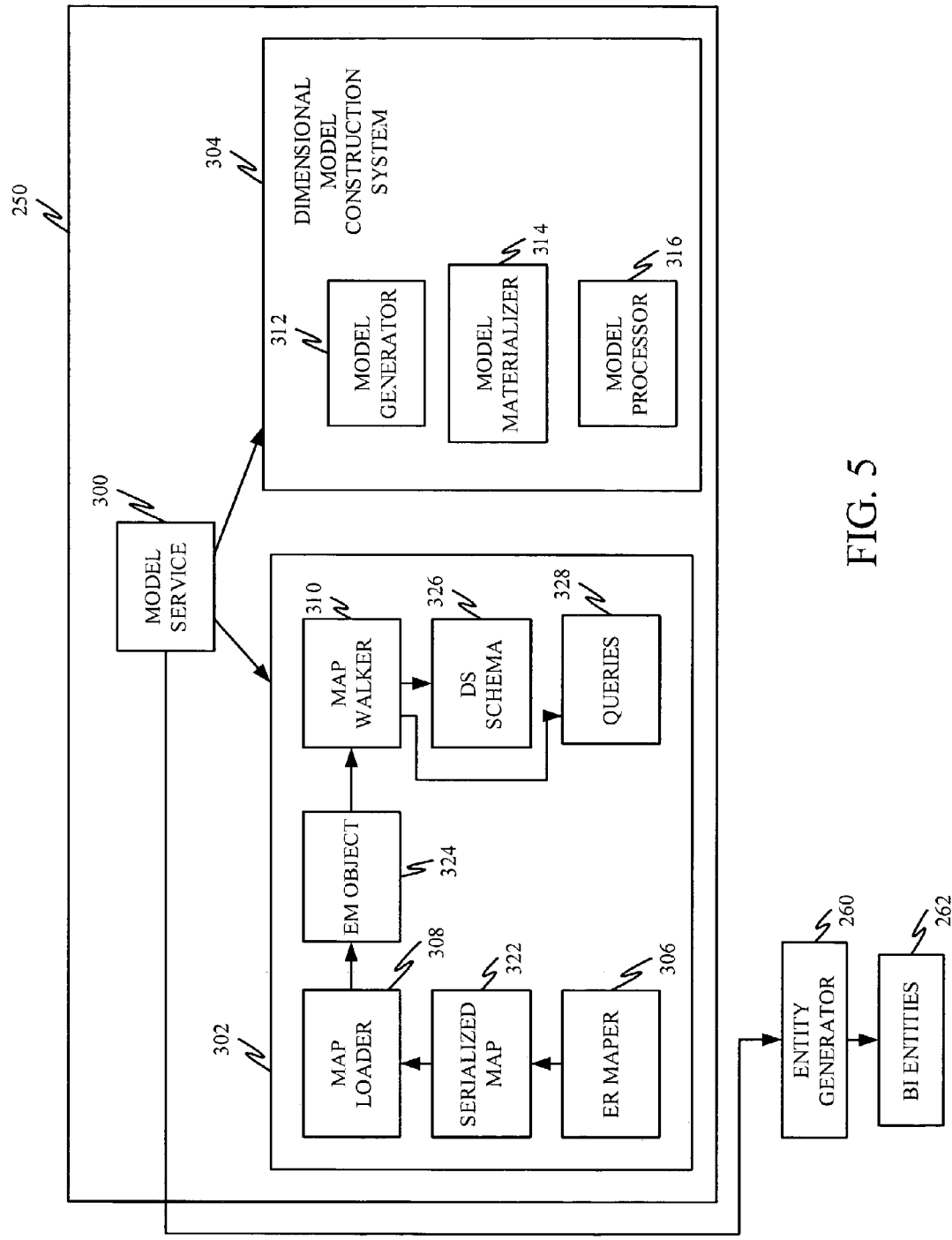
FIG. 5 is a more detailed block diagram of a model services component in accordance with one embodiment of the present invention.
Figure 6A:
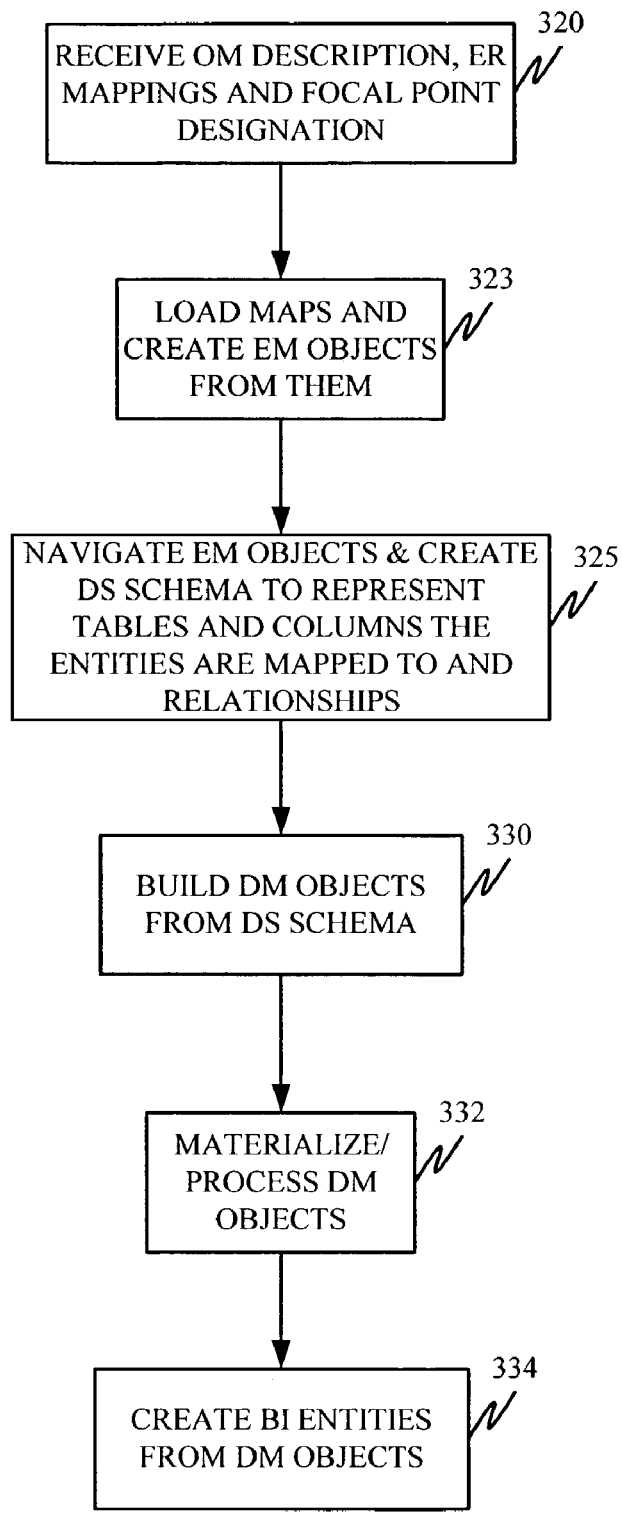
FIG. 6A is a flow diagram better illustrating the operation of the model services component shown in FIG. 5.

FIG. 5 is a more detailed block diagram of model services system 250. FIG. 6A is a flow diagram better illustrating the operation of system 250 shown in FIG. 5. FIGS. 5 and 6A will be described in conjunction with one another. FIG. 5 shows that model services system 250 includes a model service component 300, a map system 302 and a dimensional model construction system 304. Map system 302, in turn, includes entity relation (ER) mapper 306, map loader 308, and map walker 310. Dimensional model construction system 304 includes model generator 312, model materializer 314 and model processor 316. FIG. 5 also illustrates entity generator 260 and BI entities 262.

Model services component 300 provides a main user interface to accept focal point specification 252, object description 254 and ER mappings 256. Model services component 300 can also invoke the functionality associated with map system 302, dimensional model construction system 304 and entity generator 260. Thus, as a first step in the conversion process, model services system 250 receives, through the top level interface implemented by component 300, focal point specification 252, object description 254 and persistent data storage mappings 256. This is indicated by block 320 in FIG. 6A.

Figure 6B:
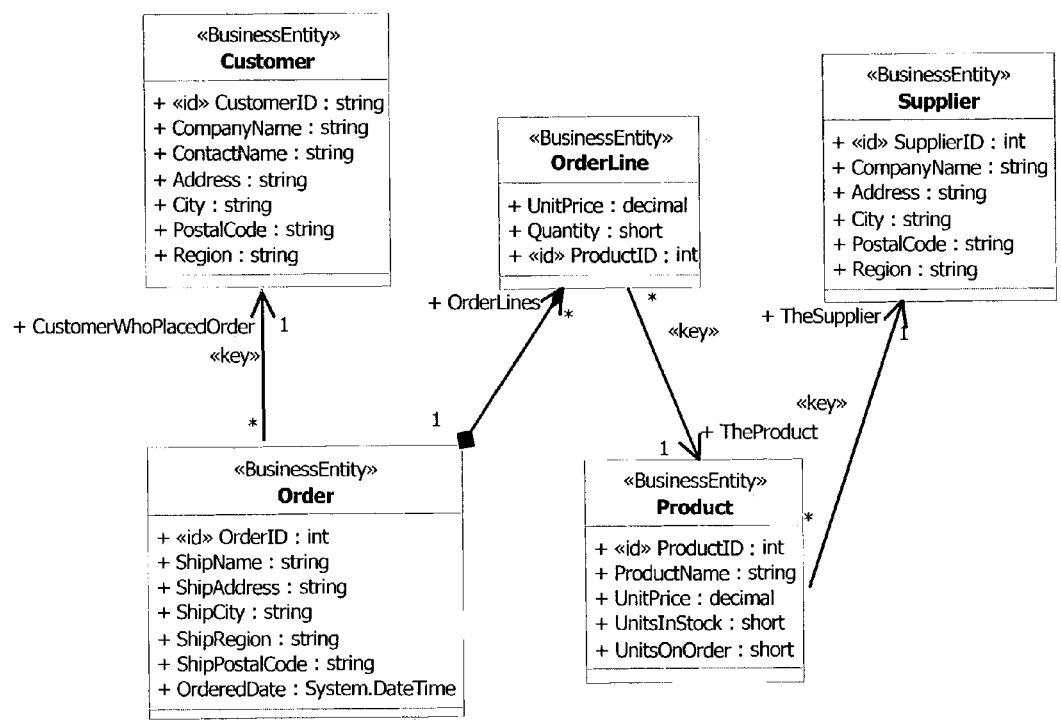
FIG. 6B is a more complex example of an object model description in the form of a UML class diagram.

For the sake of the present example, a more detailed object description than that shown in FIG. 4B is warranted. Therefore, assume for the sake of the present description that model services system 250 receives, as the object description, the UML class diagram shown in FIG. 6B. It is similar to that shown in FIG. 4B, except that it is slightly more complex and includes a bit more detail.

Model services component 300 provides these inputs to map system 302 and invokes certain functionality in map system 302. Using the ER mapper, the user produces serialized ER maps 256 to described how the object model is mapped to the relational database. These serialized maps 322 are then loaded by map loader 308. Map loader 308 deserializes those maps and converts them to entity map (EM) objects 324. The precise form of EM objects 324 is not important. They are simply objects generated from the serialized maps 322 that are predefined such that the structure of EM objects 324 is known by map walker 310. Loading maps 322 and creating EM objects 324 is indicated by block 323 in FIG. 6A.

Map walker 310 navigates EM objects 324 and generates a data set schema to represent tables and columns that the entities are mapped to in the relational database, and to represent the relationship among them. Navigating the EM objects to create data set schema 326 is indicated by block 325 in FIG. 6A. The data set schema 326 generated by map walker 340 forms the basis for constructing a dimensional model cube in the dimensional model. Map walker 310 can also fill in any additional information in the data set schema 326 required by the dimensional model. In addition, map walker 310 generates queries 328 to tables in the relational database that will be used to define Fact tables in the dimensional models. Schema 326 is then provided to dimensional model construction system 304. In particular, model generator 312 builds dimensional model cubes based on schema 326. Building the dimensional model cubes from data set schema 326 is illustrated by block 330 in FIG. 6A and is described in greater detail below with respect to FIG. 7.

Model materializer 314 provides an interface to materialize the dimensional models generated by model generator 312. Materializing the dimensional models is indicated by block 332 in FIG. 6A. Model processor 316 provides an interface to process the models materialized by model materializer 314. It should be noted that, at this point, the dimensional model can be queried using MDX or any other language used to query a multi-dimensional model. However, in accordance with a further embodiment of the present invention, entity generator 260 is invoked by system 250 to generate BI entities 262 from the dimensional model created. Creating BI entities from the dimensional model objects is illustrated by block 334 in FIG. 6A and is described in greater detail below with respect to FIGS. 10A-10B.

Figure 7:
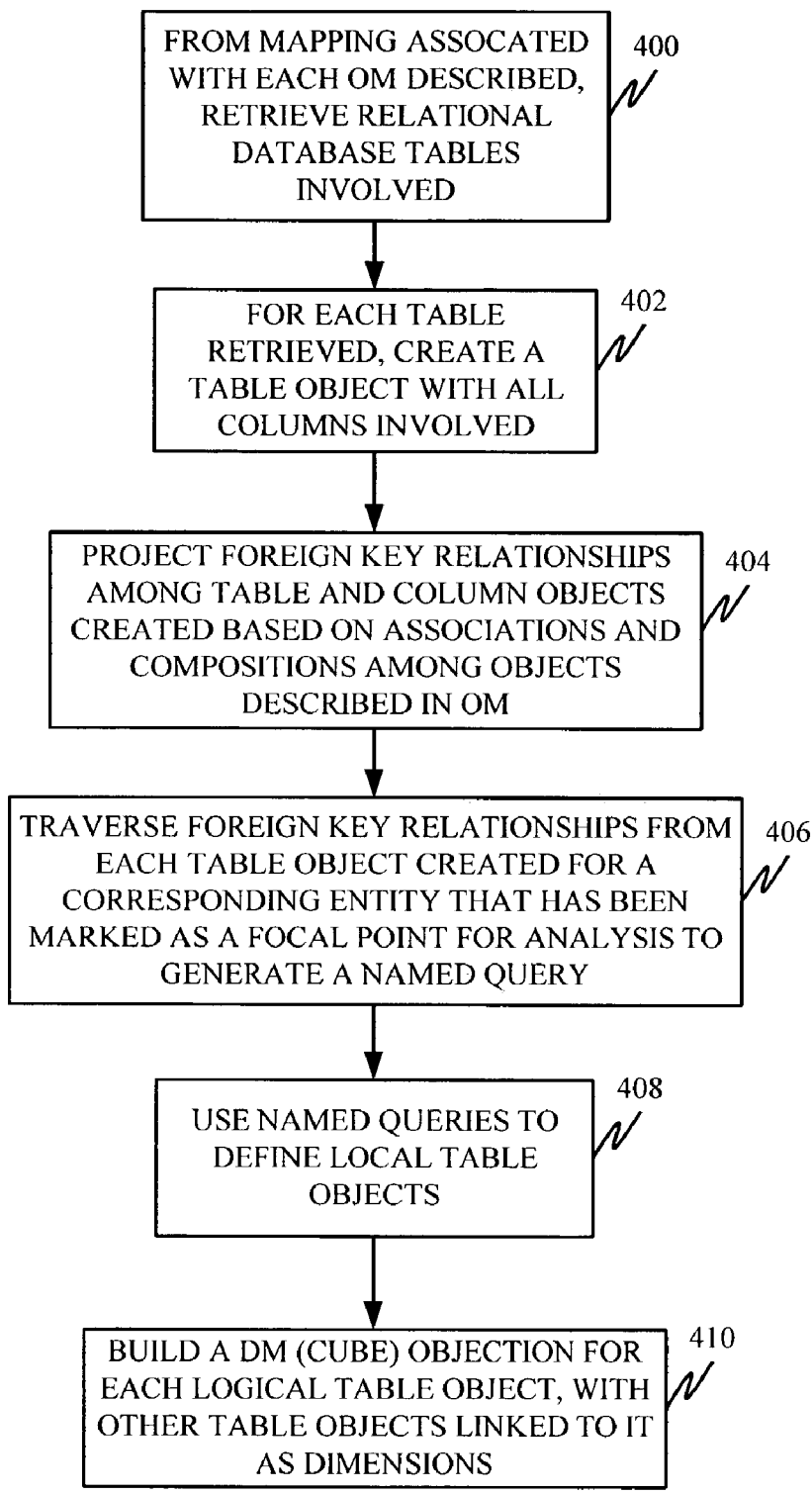
FIG. 7 is a flow diagram illustrating the creation of a dimensional model in accordance with one embodiment of the present invention.

FIG. 7 is a flow diagram better illustrating the creation of a dimensional model from an object model using the map walker 310 and dimensional model construction system 304 shown in FIG. 5. From the ER mappings associated with each entity in the object model described, the relational database tables involved with those entities are retrieved. This is indicated by block 400 in FIG. 7. For each table retrieved, a table object is created. The table object has fields which include all of the columns associated with the table. This is indicated by block 402 in FIG. 7.

Foreign key relationships among the table and column objects created are projected based on the associations and compositions among objects described in the object model description (such as the UML class diagram) being processed. The map walker 310 then traverses foreign key relationships from each table object created, for a corresponding entity that has been marked as a focal point for analysis. Recall that the focal points are specified by a focal point specification file which has also been input by the user. The foreign key relationships are traversed in a many-to-one direction toward table objects whose corresponding entity has been marked as a focal point for analysis, in order to generate a named query. The named query can be synthesized by combining the identified tables using an appropriate persistent data store query statement (such as a structured query language (SQL) statement). Thus, the named query is designed to reach out to other dimensions associated with each table object, based on focal points specified by the user.

Figure 8:
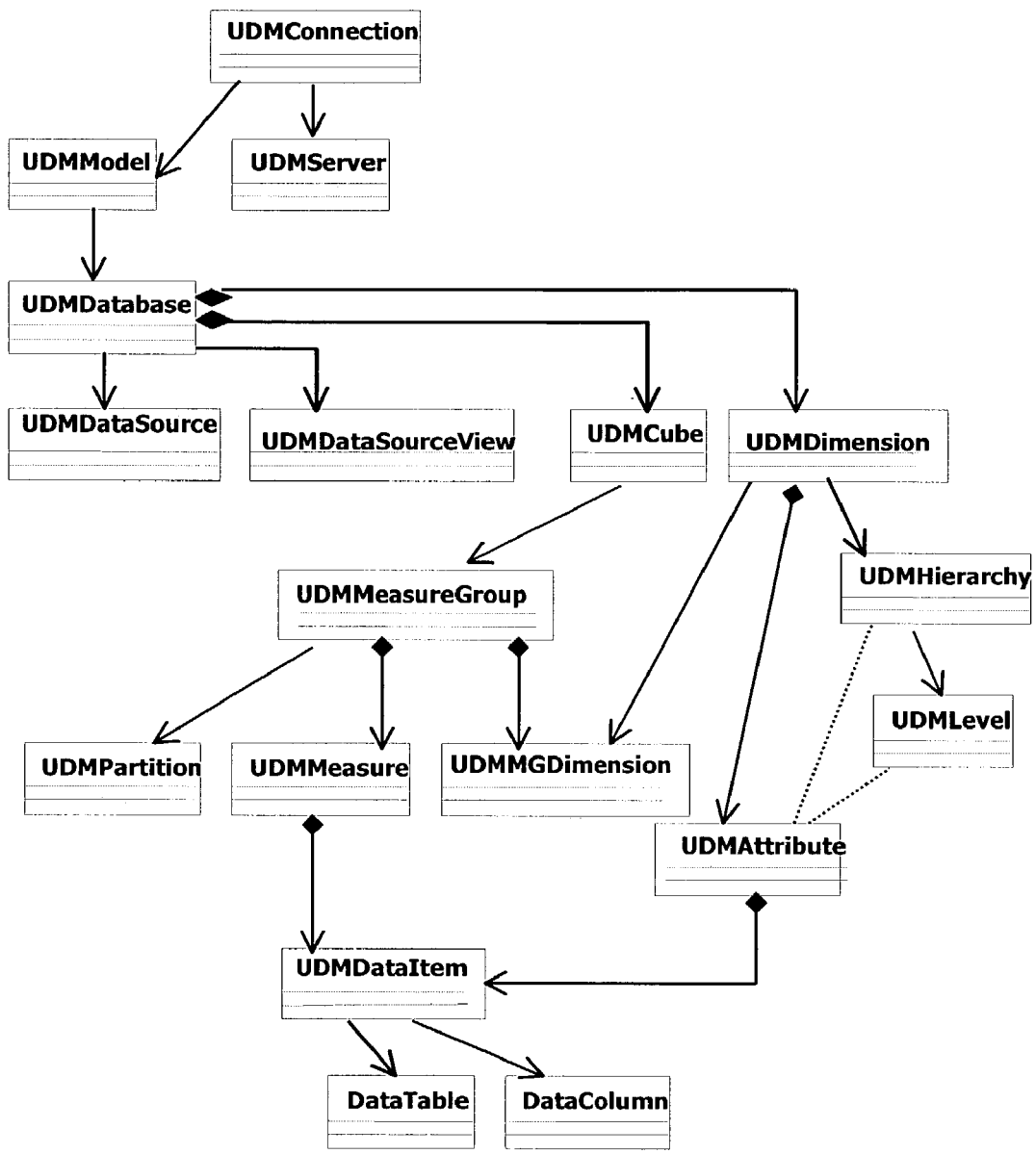
FIG. 8 is one embodiment of a class diagram for a generalized form of a multi-dimensional model.
Figure 9:
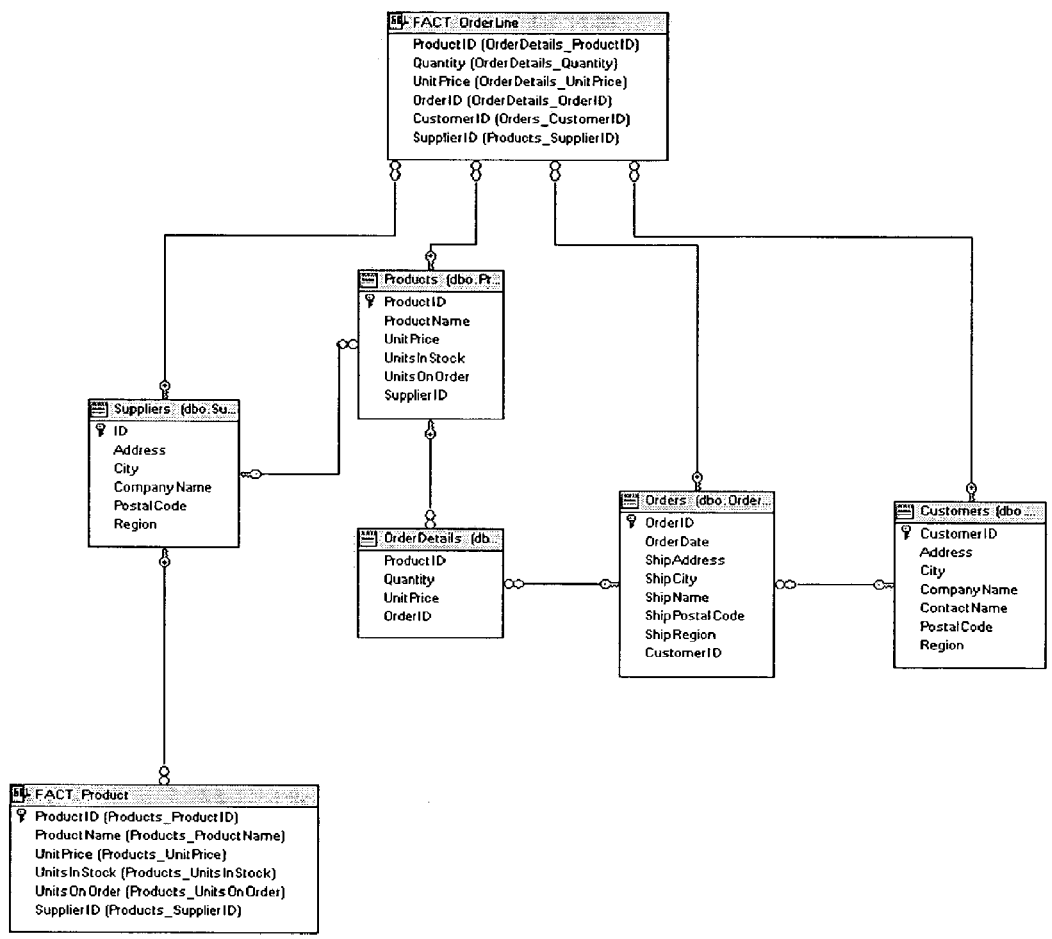
FIG. 9 is a specific example of a dimensional model in accordance with one embodiment of the present invention.

The named queries are then used to create logical view objects for the dimensional model. This is indicated by block 408. A dimensional model cube is then built for each logical table object, with other table objects linked to it as dimensions. This is indicated by block 410. FIG. 8 illustrates one exemplary class diagram for a generalized form of a multi-dimensional object in the dimensional model. FIG. 9 illustrates one exemplary dimensional model materialized and illustrating the foreign key relationships between the Fact table and the various dimensions associated with it.

Appendix C illustrates another embodiment of pseudo code illustrating how model services system 250 calls the various components thereof in order to implement the functionalities discussed.

It should be noted, at this point, that the dimensional model, an example of which is shown in FIG. 9, has been automatically generated by inferring foreign key relationships from the structure (compositions and associations) in the object model. The user can query the automatically generated dimensional model using tools designed for that purpose. As discussed above, MDX is a language designed to query a dimensional database.

Figure 10:
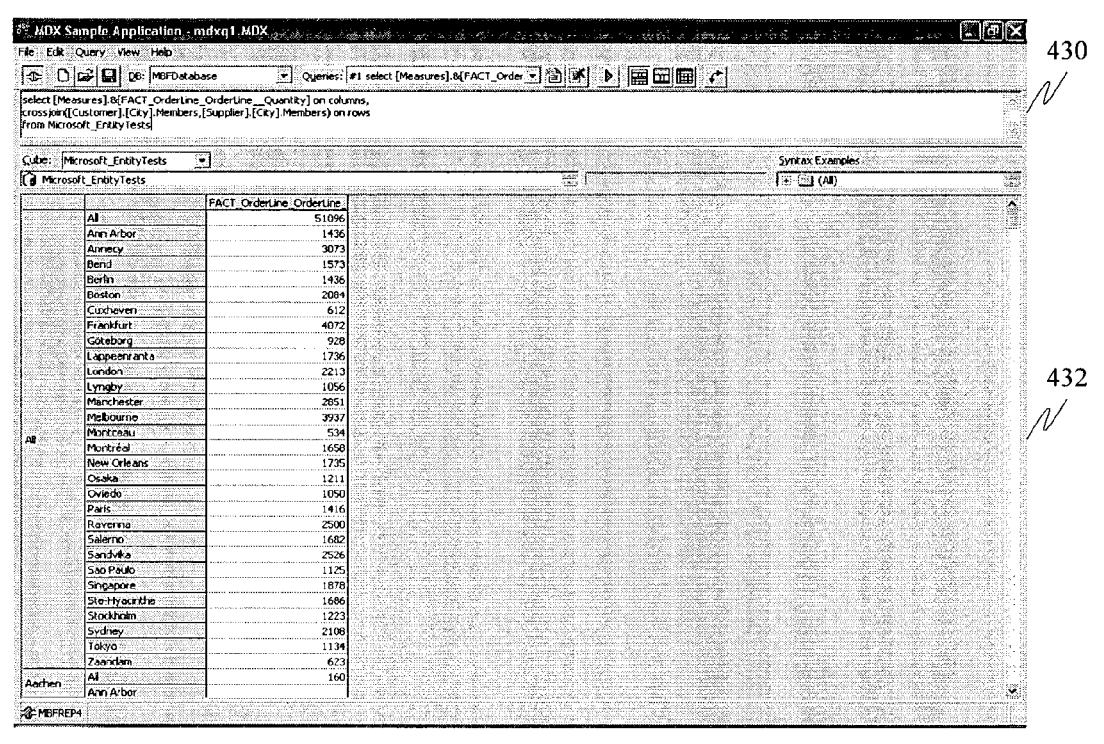

An exemplary query for querying the dimensional model illustrated by FIG. 9 is shown in FIG. 10. FIG. 10 shows a screen shot having a query field 430 which contains an MDX query expression. FIG. 10 also includes a result field 432 which contains the results returned by the query.

As also indicated above, MDX and other dimensional model querying languages can have fairly complex syntax or be otherwise difficult to learn. Therefore, another embodiment of the present invention converts the automatically created dimensional model into another set of objects referred to herein as BI entities 262 so that they can be queried by users using object oriented expressions, rather than the complicated syntactical expressions required by dimensional model querying languages. To satisfy the reporting requirements of the client it is not enough to query the original object model, because the dimensional model may have a Fact table which has attributes from two different entities in the object model as dimensions thereof. Therefore, in order to make it easier to access the dimensional model, in accordance with one embodiment of the present invention, BI entities 262 are created.

BI entities 262 provide a conventional object oriented view of the underlying dimensional model 258. A user can thus create efficient query criteria and consume dimensional data in a manner in which the actual querying of the dimensional model is performed transparently to the user. BI entities 262 hide the dimensional model details, such as the cube, the dimensions, the hierarchy, the native query language, etc., and the user is only required to use objects and attributes.

Figure 11A:
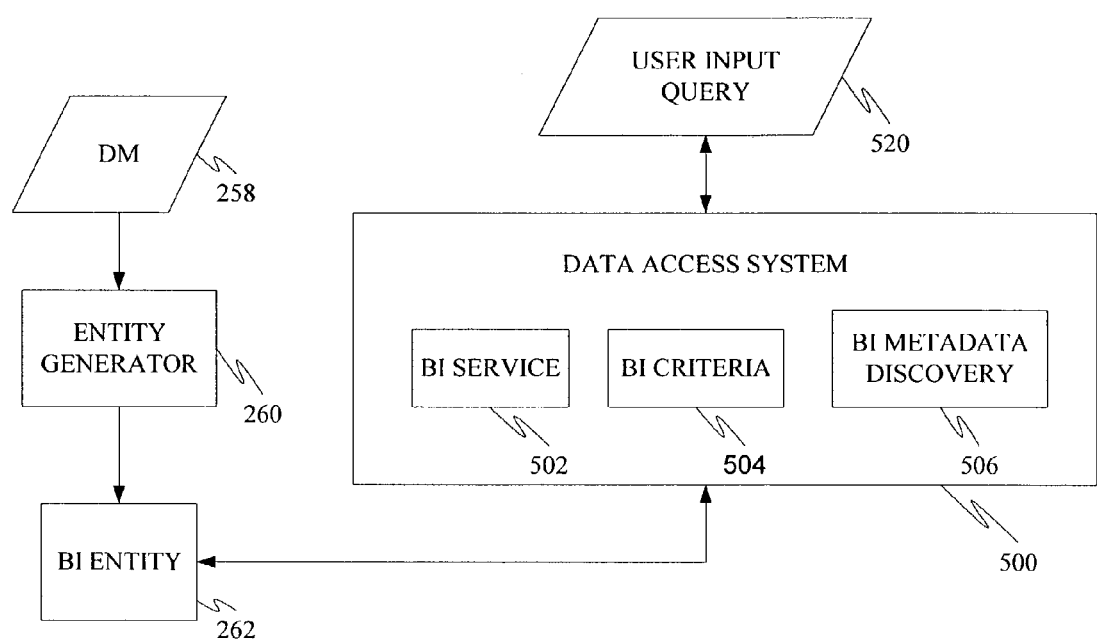
FIG. 11A is a block diagram of a system for creating a business entity and generating reports in accordance with one embodiment of the present invention.
Figure 11B:
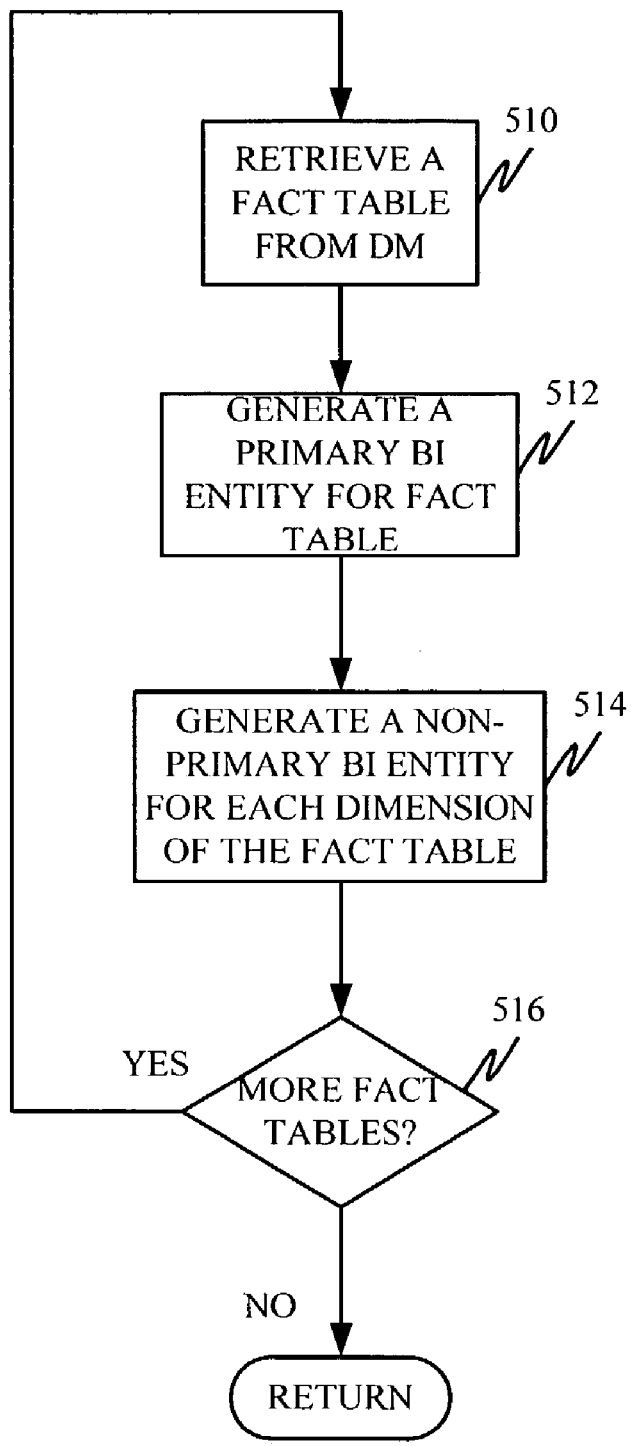
FIG. 11B is a flow diagram illustrating the creation of a business entity in accordance with one embodiment of the present invention.

FIG. 11A illustrates entity generator 258, along with data access system 500 which, itself, includes a BI service component 502, a BI criteria component 504 and a BI metadata discovery component 506. FIG. 11B is a flow diagram better illustrating how entity generator 258 generates BI entities 262.

In order to generate BI entities 262, recall that entity generator 260 has access to underlying dimensional model 258. Entity generator 260 first retrieves a Fact table from dimensional model 258. This is indicated by block 510 in FIG. 11B. Entity generator 260 then generates a primary BI entity for the Fact table retrieved. The numerical values (or measures) in the Fact table become the properties of the newly created BI entity. Generating a primary BI entity for the retrieved Fact table is indicated by block 512 in FIG. 11B.

Figure 12:
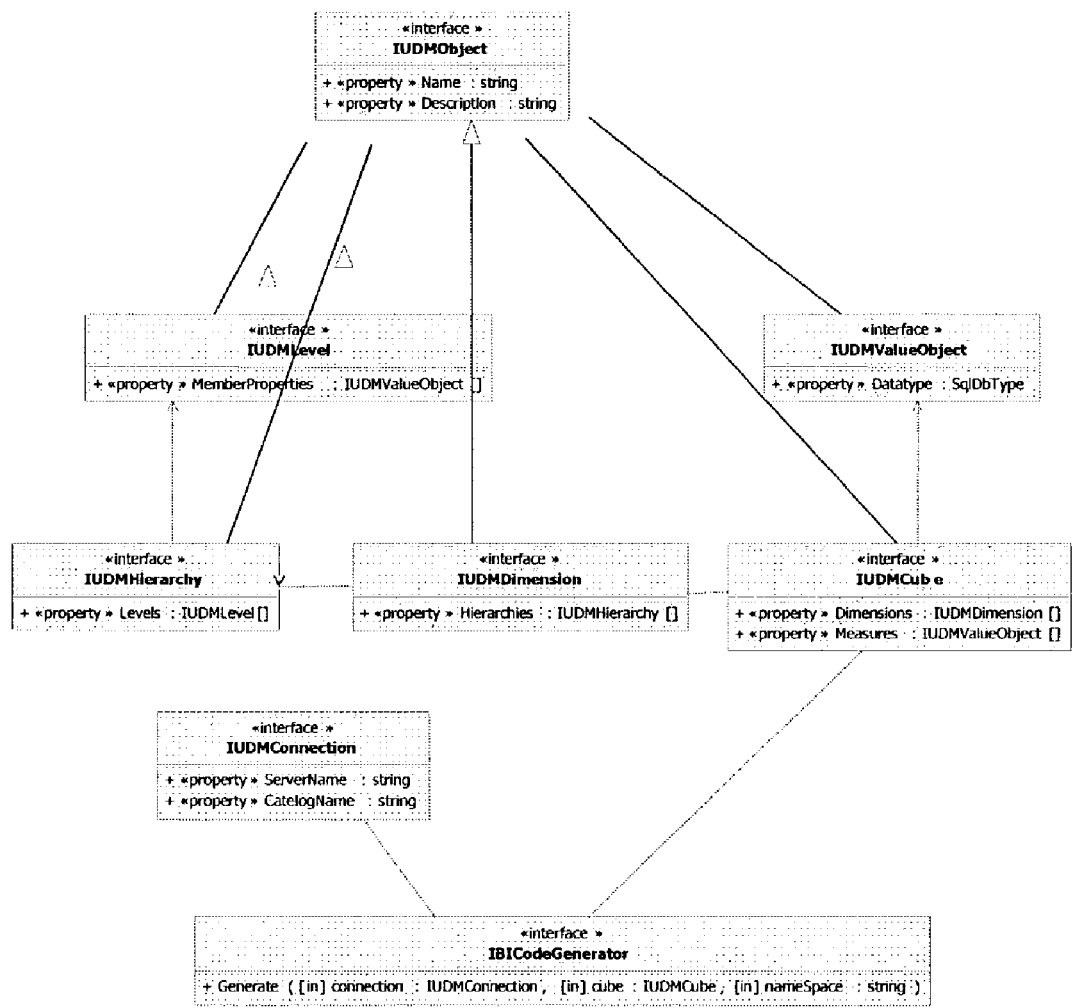
FIG. 12 illustrates one exemplary embodiment of a UML class diagram for an entity generator.

Entity generator 260 then generates a non-primary BI entity for each dimension of the Fact table. It should be noted that nested classes can be used to maintain the original structure, hierarchy, and levels of the dimensional model. Generating the non-primary BI entities is indicated by block 514 in FIG. 11B. Entity generator 260 performs these operations for each Fact table in dimensional model 258, as indicated by block 516. One exemplary embodiment of a class diagram for entity generator 260 is illustrated in FIG. 12. The interface for invoking entity generator 260 is illustrated in FIG. 13. Appendix D illustrates the interfaces supported by the various components of system 250, and by entity generator 260.

Figure 14:
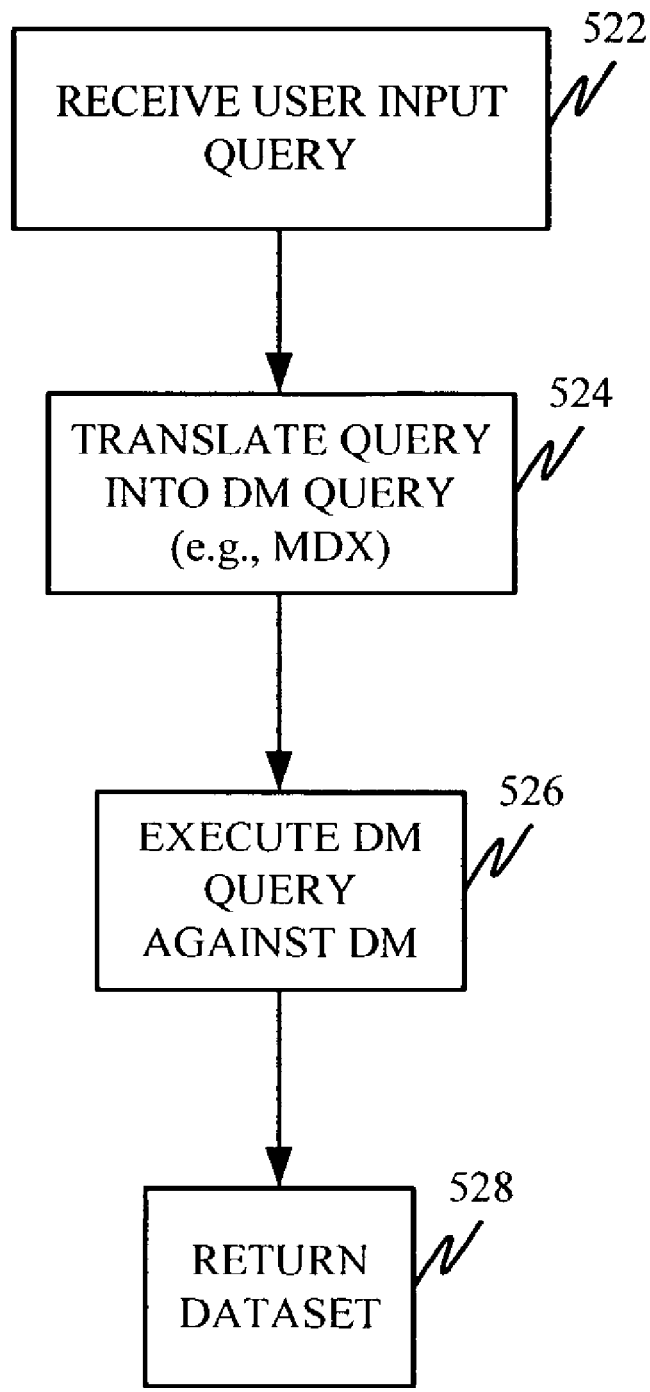
FIG. 14 is a flow diagram illustrating how data is retrieved from a business entity in accordance with one embodiment of the present invention.
Figure 16:
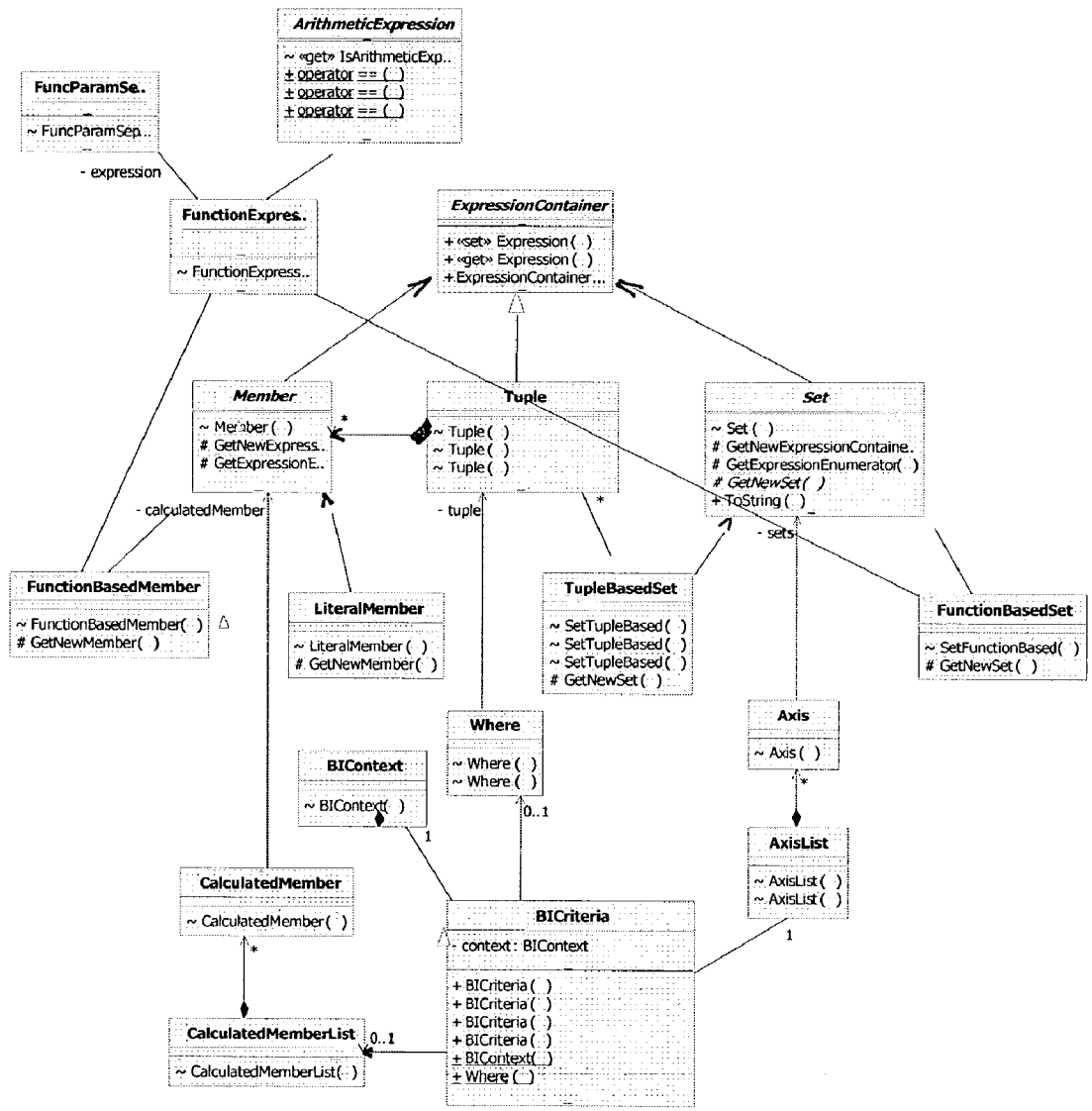
FIG. 16 illustrates one embodiment of a class diagram for a BI criteria component.

FIG. 14 is a flow diagram better illustrating how data represented by BI entities 262 is accessed using data access system 500. First, a user input query 520 is provided to data access system 500. Receiving the user input query is indicated by block 522 in FIG. 14. BI criteria component 504 illustratively provides an interface through which the user can input user input query 520. The BI criteria interface is illustrated in FIG. 15 and an illustrative class diagram for BI criteria component 504 is illustrated by FIG. 16.

Figure 17:
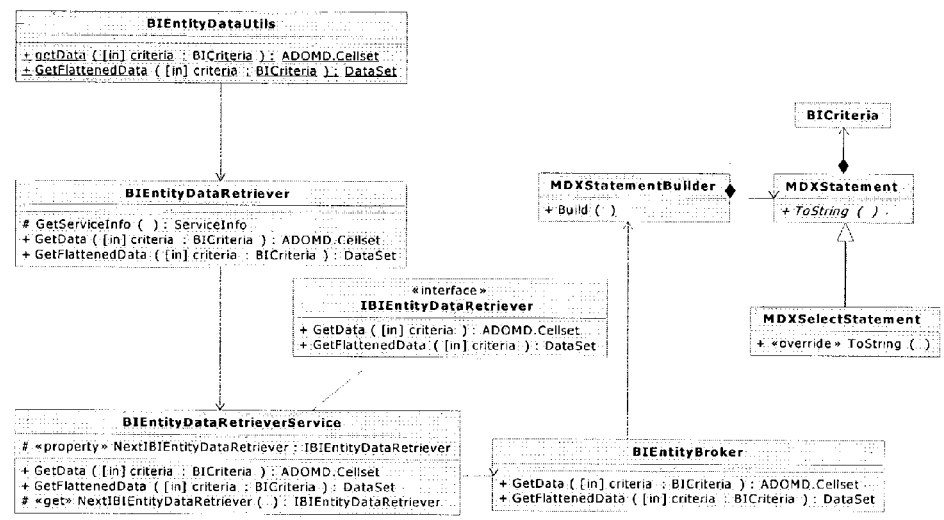
FIG. 17 is an exemplary class diagram of a BI service component.

The user input query 520, input through BI criteria 504, is converted by BI service component 502 into a dimensional model query expression, such as an MDX expression, which can be executed against the dimensional model 258. One exemplary class diagram for BI service component 502 is illustrated in FIG. 17. Translation of the user input query 520 into the dimensional model query and execution of the dimensional model query against the dimensional model are indicated by blocks 524 and 526 in FIG. 14. Of course, MDX is used as an example only, and any of a wide variety of different dimensional model query expressions can be supported by the BI criteria component 504. The following is one exemplary list of MDX expressions which are supported by BI service component 502 and BI criteria component 504, although it should be emphasized that other, different, or additional expressions can be supported as well:

MDX set functions supported:

Cross join, children, descendants, ancestors, all members, members, etc.;

MDX member functions supported:

CurrentMember, DefaultMember, FirstChild, LastChild, Lead, Lag, etc . . . ;

MDX numeric functions supported:

Average, Aggregate, count, sum, max, min, median, IIF, etc . . . .

Table 1 lists one exemplary set of MDX operators which are supported.

TABLE 1

Supported Operators

| MDX Operators | Equivalent C# Operators |
| --- | --- |
| + (Arithmetic) | + |
| − (Arithmetic) | − |
| * (Arithmetic) | * |
| / (Arithmetic) | / |
| < (Comparison) | < |
| > (Comparison) | > |
| <= (Comparison) | <= |
| >= (Comparison) | >= |
| <>(Comparison) | != |
| = (Comparison) | == |
| AND (Bitwise) | && |
| OR (Bitwise) | \|\| |
| NOT (Bitwise) | ! |
| XOR (Bitwise) | ^ |

The following illustrates one exemplary criteria definition which forms the user input query 520 in the C-Sharp programming language.

TABLE 2

```
//example with arithmetic operation
BICriteria crit = new BICriteria(
    BICriteria.BIContext(
        typeof(SalesBI)),
    BICriteria.CalculatedMemberList(
        (BIProperty)"SalesBI.AveragePrice",
        (BIproperty)"SalesBI.SaleDolloars" /
(BIProperty)"BISales.SalesUnits" ),
    BICriteria.AxisList(
    Set.AllMembers((BIProperty)"ProductBI.DeafultH
ierachy.Category"),
    Set.Members((BIProperty)"TimeBI.DefaultHierarc
hy.Quarter")),
    BICriteria.Where(
        "StateBI.North America.USA.South
West.California"));
    //example with logical operator
crit = new BICriteria(
    BICriteria.BIContext(
        typeof(SalesBI)),
    BICriteria.CalculatedMemberList(
        (BIProperty)"SalesBI.profitable",
        ((BIProperty)"SalesBI.SalesDollars" >
(BIProperty)"SalesBI.Expense")),
    BICriteria.AxisList(
        Set.AllMembers((BIProperty)"SalesBI")));
```

After the dimensional model query is executed, BI service component 502 then returns a result set as indicated by block 528 in FIG. 14.

Finally, BI metadata discovery component 506 can also be provided. BI metadata discovery component 506 is illustratively provided to perform a system wide BI entity search and to return detailed metadata retrieved for one or more BI entities. Of course, this can be useful to the user.

An example of how data is accessed may be helpful. By way of example, assume that a Sales cube in dimensional model 258 has two measures, SalesUnits and SalesDollars, and one dimension "product" which in turn has only one hierarchy "cat", which in turn, has one level "category". The generated BI class codes illustratively looks as follows:

TABLE 3

```
namespace Microsoft.BusinessFramework.Reporting.BI.Test
{
    using System;
    using Microsoft.BusinessFramework.Reporting.BIEntity;
    /// <summary>
    /// Summary description for SalesBI.
    /// </summary>
    [BI(true,"Measures")]
    public class SalesBI : IBIEntity
    {
        //fields
        private Int32 saleUnits;
        private Double saleDollars;
        private ProductBI product;
        //constructor
        public SalesBI( ) {}
        //properties
        [BIProperty(BIPropertyType.Measure, "SaleUnits")]
        public Int32 SaleUnits
        {
            get
            {
                return saleUnits;
            }
            set
            {
                saleUnits = value;
            }
        }
        [BIProperty(BIPropertyType.Measure, "SaleDollars")]
```

TABLE 3-continued

```
public Double SaleDollars
{
  get
  {
    return saleDollars;
  }
  set
  {
    saleDollars = value;
  }
}
[BIProperty(BIPropertyType.Dimension, "product")]
public ProductBI Product
{
  get
  {
    return product;
  }
  set
  {
    product = value;
  }
}
}
/// <summary>
/// Summary description for ProductBI.
/// </summary>
[BI(false,"product")]
public class ProductBI : IBIEntity
{
  //fields
  private CatHierarchy cat;
  private CategoryHierarchy category;
  //constructor
  public ProductBI( ) {}
  //properties
  [BIProperty(BIPropertyType.Hierarchy, "cat")]
  public CatHierarchy CAT
  {
    get
    {
      return cat;
    }
    set
    {
      cat = value;
    }
  }
  [BIProperty(BIPropertyType.Hierarchy, "category")]
  public CategoryHierarchy Category
  {
    get
    {
      return category;
    }
    set
    {
      category = value;
    }
  }
}
/// <summary>
/// Summary description for CatHierarchy.
/// </summary>
public class CatHierarchy
{
  //fields
  private CategoryLevel category;
  //constructor
  public CatHierarchy( ) {}
  //properties
  [BIProperty(BIPropertyType.Level, "category")]
  public CategoryLevel Category
  {
    get
    {
      return category;
    }
    set
    {
```

TABLE 3-continued

```
      category = value;
    }
  }
  /// <summary>
  /// Summary description for CategoryLevel.
  /// </summary>
  public class CategoryLevel
  {
    //fields
    private String @value;
    //constructor
    public CategoryLevel(String @value)
    {
      this.@value = @value;
    }
    //implicit conversion operator
    public static implicit operator String(CategoryLevel obj)
    {
      return obj.@value;
    }
    //properties
  }
}
/// <summary>
/// Summary description for CategoryHierarchy.
/// </summary>
public class CategoryHierarchy
{
  //fields
  private CategoryLevel category;
  //constructor
  public CategoryHierarchy( ) {}
  //properties
  [BIProperty(BIPropertyType.Level, "category")]
  public CategoryLevel Category
  {
    get
    {
      return category;
    }
    set
    {
      category = value;
    }
  }
  /// <summary>
  /// Summary description for CategoryLevel.
  /// </summary>
  public class CategoryLevel
  {
    //fields
    private String @value;
    //constructor
    public CategoryLevel(String @value)
    {
      this.@value = @value;
    }
    //implicit conversion operator
    public static implicit operator String(CategoryLevel obj)
    {
      return obj.@value;
    }
    //properties
  }
}
}
```

One example of a user input query input through BI criteria component 504 is as follows:

TABLE 4

```
BICriteria crit = new BICriteria(
  BICriteria.BIContext(
    typeof(Microsoft__EntityTestsBI)
  ),
```

TABLE 4-continued

```
BICriteria.AxisList(
    BICriteria.Axis(
    (BIProperty)"Microsoft_EntityTestsBI.FACT_
Product_Product_UnitsInStock",
    (BIProperty)"Microsoft_EntityTestsBI.FACT_
OrderLine_OrderLine_UnitPrice"),
    BICriteria.Axis(Set.Members((BIProperty)"OrderBI"))));
```

Figure 18:
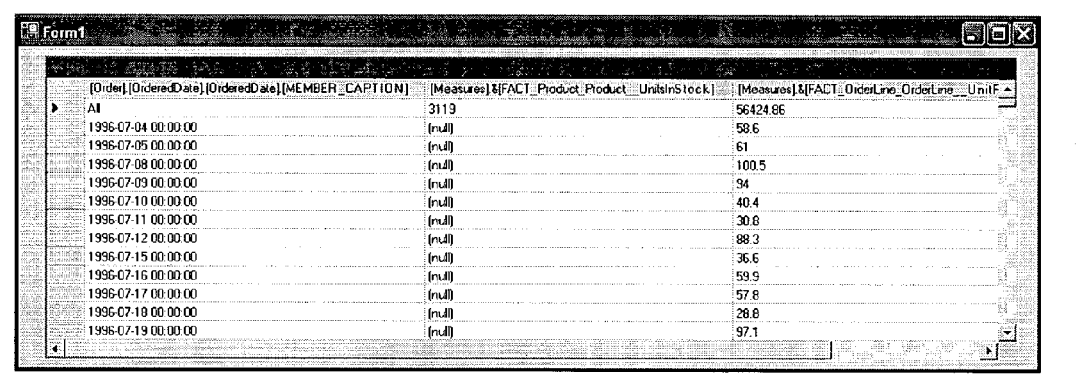

An illustrative and exemplary result set returned based on the user input query is shown in FIG. 18.

It can thus be seen that the present invention provides a number of significant advantages over prior systems. One aspect of the present invention automatically generates a dimensional model from an object model. The automatic generation is performed by inferring the dimensional model from relationships specified in the object model and user-designated focal points, as well as mappings back to the relational database.

In another embodiment of the present invention, objects are provided to abstract away from the specifics of a dimensional model. Therefore, a user can access a dimensional model using only object oriented expressions, without requiring specific knowledge of any dimensional model querying language.

Of course, in another embodiment of the present invention, both systems are used together such that the dimensional model is automatically created from a user-specified object model, and the entities which abstract away from the dimensional models are automatically created as well. Thus, all a user must do is provide the focal points, a description of the object model and its persistent data storage mappings, and this embodiment of the present invention automatically generates the necessary components for the user to access the data according to a desired reporting structure using only object oriented expressions without going through the laborious tasks of manually creating a dimensional model and then generating dimensional model-specific queries against the dimensional model.

Although the present invention has been described with reference to particular embodiments, workers skilled in the art will recognize that changes may be made in form and detail without departing from the spirit and scope of the invention.

What is claimed is:

1. A computer implemented dimensional model generation system having a tangible component, comprising:
  a dimensional model generation component comprising a map system generating a data set schema based on mapping information and a model construction system, coupled to the map system, constructing a dimensional model based on the data set schema, the dimensional model generation component configured to receive, as inputs;
    object model description information describing a relationship between entities in an object model;
    a user-defined focal point of analysis identifying information in the object model as a focal point in the dimensional model; and
    the mapping information indicative of a mapping between entities in the object model and a persistent data store;
  the dimensional model generator being configured to automatically generate the dimensional model based on the inputs.

2. The dimensional model generation system of claim 1 wherein the map system comprises:
  a map object generator generating map objects based on user-provided mapping information; and
  a map walker traversing the map objects and creating the data set schema based on traversal of the map objects.

3. The dimensional model generation system of claim 2 wherein the map object generator is configured to retrieve relational database tables, having columns, based on the mapping information.

4. The dimensional model generation system of claim 3 wherein the map object generator is configured to generate table and column objects for tables and columns retrieved.

5. The dimensional model generation system of claim 4 wherein the map walker is configured to apply foreign key relationships tote table and column objects created based on the relationships described in the object model description information.

6. The dimensional model generation system of claim 5 wherein the map walker is configured to identify entities marked as focal points based on the focal point identifier.

7. The dimensional model generation system of claim 6 wherein the map walker is configured to generate a named query by traversing the foreign key relationships for table objects corresponding to the identified entities.

8. The dimensional model generation system of claim 7 wherein the map walker is configured to use the named query to construct a logical view in the data set schema.

9. The dimensional model generation system of claim 7 wherein the model construction system comprises:
  a model generator generating the dimensional model from the data set schema.

10. The dimensional model generation system of claim 7 wherein the model construction system comprises:
  a model materializer supporting an interface which, when invoked, materializes a specified dimensional model.

11. The dimensional model generation system of claim 2 wherein the map object generator comprises:
  a mapper component configured to receive the mapping information and generate a serialized representation of the user provided mapping information; and
  a map loader, coupled to the mapper, configured to generate the map objects based on the serialized representation of the mapping information.

12. The dimensional model generation system of claim 2 wherein the map walker is configured to generate the data set schema to represent tables and columns in the persistent data store that the entities described by the object model description information are mapped to.

13. A method, implemented at least in part by a machine, of generating a dimensional model from an object model that is mapped to a persistent data store, comprising:
  automatically generating the dimensional model based on inputs including object description information indicative of relationships among objects in the object model, user-defined focal point information indicative of focal points of analysis in the object description information that is indicative of the object model, and mapping information indicative of mappings between objects in the object model and the persistent data store.

14. The method of claim 13 and further comprising, prior to automatically generating:
  receiving the inputs as computer readable inputs.

15. The method of claim 14 wherein automatically generating comprises:
  generating a data set schema based on the mapping information.

16. The method of claim 15 wherein automatically generating comprises:
constructing the dimensional model based on the data set schema.

17. The method of claim 16 wherein generating the data set schema comprises:
generating map objects based on the mapping information; and
traversing the map objects and creating the data set schema based on traversal of the map objects.

18. The method of claim 17 wherein generating map objects comprises:
retrieving relational database tables, having columns, based on the mapping information.

19. The method of claim 18 wherein generating map objects comprises:
generating table and column objects for tables and columns retrieved.

20. The method of claim 19 wherein traversing the map objects comprises:
applying foreign key relationships to the table and column objects created based on the relationships described in the object model description information.

21. The method of claim 20 wherein traversing the map objects comprises:
identifying entities marked as focal points based on the focal point identifier.

22. The method of claim 21 wherein traversing the map objects comprises:
generating a named query by traversing the foreign key relationships for table objects corresponding to the identified entities.

23. A computer readable medium having stored thereon computer readable instructions which, when executed, cause a computer to perform steps of:
receiving, as computer readable inputs, object description information indicative of relationships among objects in the object model, focal point information indicative of user-defined focal points analysis in the object model, indicated by the object description information and mapping information indicative of mappings between objects in the object model and the persistent data store; and
automatically generating and outputting the dimensional model based on the inputs.

24. The computer readable medium of claim 23 wherein automatically generating comprises:
generating a data set schema based on the mapping information; and
constructing the dimensional model based on the data set schema.

25. The computer readable medium of claim 24 wherein generating a data set schema comprises:
generating map objects based on the mapping information by retrieving relational database tables, having columns, based on the mapping information, generating table and column objects for tables and columns retrieved and applying foreign key relationships to the table and column objects created based on the relationships described in the object model description information; and
traversing the foreign key relationships and creating the data set schema based on traversal of the map objects.

26. The computer readable medium of claim 25 wherein traversing the foreign key relationships comprises:
identifying entities marked as focal points based on the focal point identifier; and
generating a named query by traversing the foreign key relationships for table objects corresponding to the identified entities.

* * * * *